US012594916B2

(12) United States Patent
Nakano

(10) Patent No.: US 12,594,916 B2
(45) Date of Patent: Apr. 7, 2026

(54) BRAKE FLUID PRESSURE CONTROL DEVICE AND SADDLE-TYPE VEHICLE

(71) Applicant: Robert Bosch GmbH, Stuttgart (DE)

(72) Inventor: Ryoji Nakano, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 211 days.

(21) Appl. No.: 18/251,480

(22) PCT Filed: Nov. 2, 2021

(86) PCT No.: PCT/IB2021/060113
§ 371 (c)(1),
(2) Date: May 2, 2023

(87) PCT Pub. No.: WO2022/097015
PCT Pub. Date: May 12, 2022

(65) Prior Publication Data
US 2023/0398970 A1 Dec. 14, 2023

(30) Foreign Application Priority Data
Nov. 9, 2020 (JP) ................................. 2020-186576

(51) Int. Cl.
*B60T 8/34* (2006.01)
*B60T 8/32* (2006.01)

(52) U.S. Cl.
CPC ............ *B60T 8/344* (2013.01); *B60T 8/3225* (2013.01)

(58) Field of Classification Search
CPC .......... B60T 8/40; B60T 8/344; B60T 8/3225; B60T 8/34; B60T 13/146; B60T 13/16;
(Continued)

(56) References Cited

U.S. PATENT DOCUMENTS 5,766,026 A * 6/1998 Cooper ............... F15B 13/0867
361/736
2013/0033823 A1 * 2/2013 Nagashima ............. B60T 8/368
361/714
(Continued)

FOREIGN PATENT DOCUMENTS

DE 19545011 A1 * 4/1997 ............ B60T 8/3675
DE 19619968 A1 * 11/1997 .......... F15B 13/0857
(Continued)

OTHER PUBLICATIONS

English machined translation of JP-H1059151-A, Mar. 3, 1998.*
International Search Report and Written Opinion for Application No. PCT/IB2021/060113 dated Jan. 17, 2022 (9 pages).

*Primary Examiner* — Robert A. Siconolfi
*Assistant Examiner* — San M Aung
(74) *Attorney, Agent, or Firm* — Michael Best & Friedrich LLP

(57) ABSTRACT

To obtain a brake fluid pressure control device for a saddle-type vehicle capable of improving airtightness between a main body portion and a lid of a housing, suppressing a sealing material from leaking to the outside of the brake fluid pressure control device, and having a smaller size than the conventional one.
A brake fluid pressure control device according to the invention includes a housing which covers a coil driving a hydraulic pressure adjusting valve for opening and closing a flow path for a brake fluid and a circuit board controlling energization of the coil, the housing includes a main body portion which is provided with an opening portion and a lid which covers the opening portion and is attached to the main body portion, the main body portion includes a groove portion which is formed on the outer peripheral side of the opening portion, the lid includes an insertion wall which is inserted into the groove portion, a space for storing a sealing
(Continued)

material is formed between the insertion wall and an outer peripheral wall of the groove portion and between the insertion wall and an inner peripheral wall of the groove portion, and a length of the outer peripheral wall extending toward the lid is longer than a length of the inner peripheral wall extending toward the lid.

13 Claims, 7 Drawing Sheets

(58) Field of Classification Search
CPC ...... B60T 13/662; B60T 13/686; B60T 17/02; B60T 7/042; B60T 7/085; B62L 3/023; B05D 7/22; F16L 5/062; F16L 5/14
USPC ....................................................... 303/113.1
See application file for complete search history.

(56) References Cited

U.S. PATENT DOCUMENTS

| | | | |
|---|---|---|---|
| 2019/0359193 A1* | 11/2019 | Chiba | ........................ B60T 8/36 |
| 2019/0381984 A1* | 12/2019 | Chiba | ..................... B60T 17/02 |
| 2020/0055508 A1* | 2/2020 | Chiba | ................... F16K 27/003 |

FOREIGN PATENT DOCUMENTS

| | | | |
|---|---|---|---|
| DE | 102019217727 A1 | | 6/2020 |
| EP | 3647137 A1 | | 5/2020 |
| FR | 2766546 B1 | * | 10/1999 |
| JP | H1059151 A | * | 3/1998 |
| JP | 2000159081 A | * | 6/2000 |
| JP | 2014069779 A1 | | 4/2014 |
| JP | 2019006347 A | | 1/2019 |
| JP | 2020083166 A | | 6/2020 |
| WO | 2018151063 A1 | | 8/2018 |

* cited by examiner

[FIG. 1]
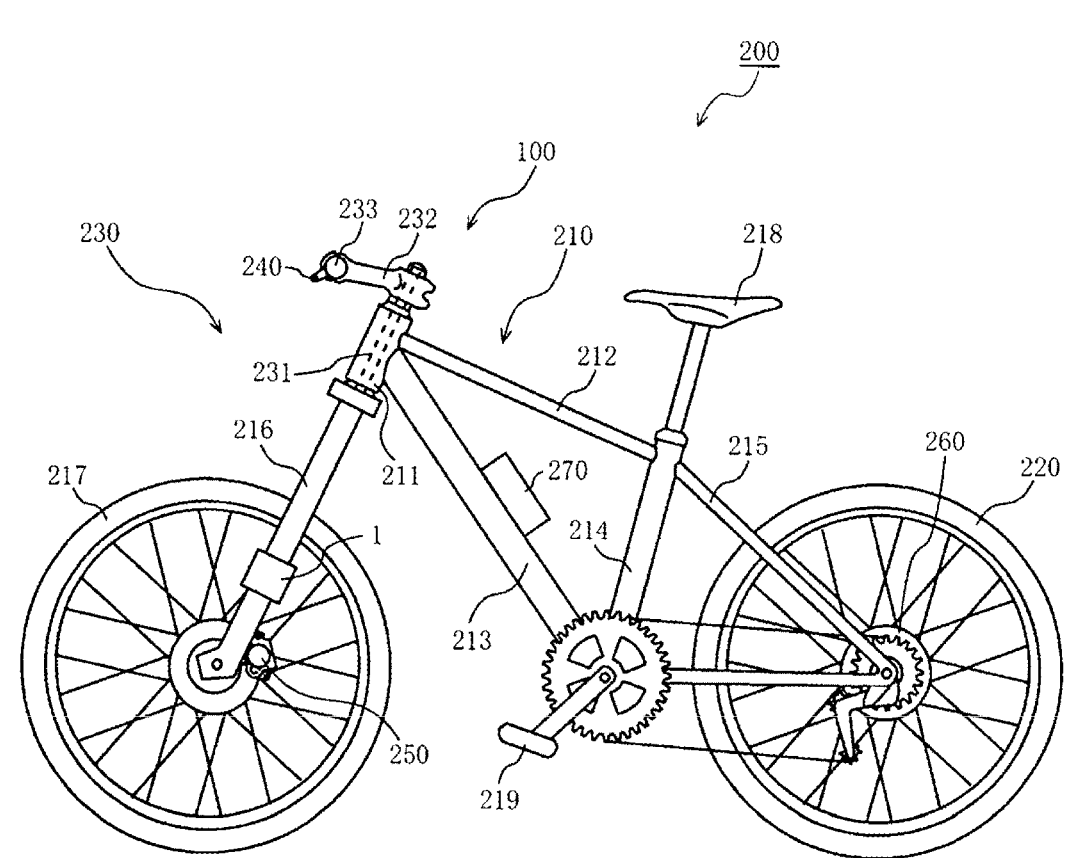

[FIG. 2]
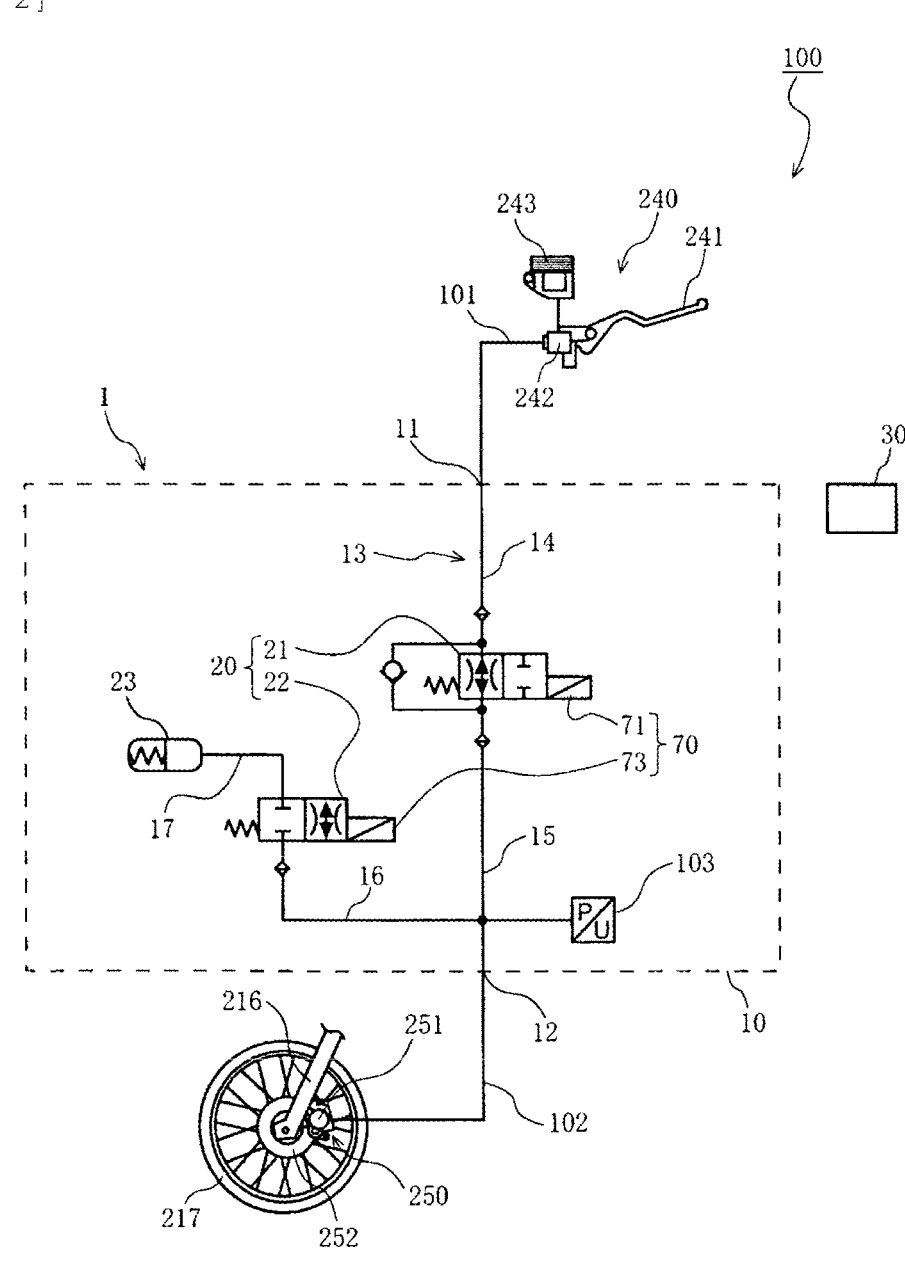

[FIG. 3]
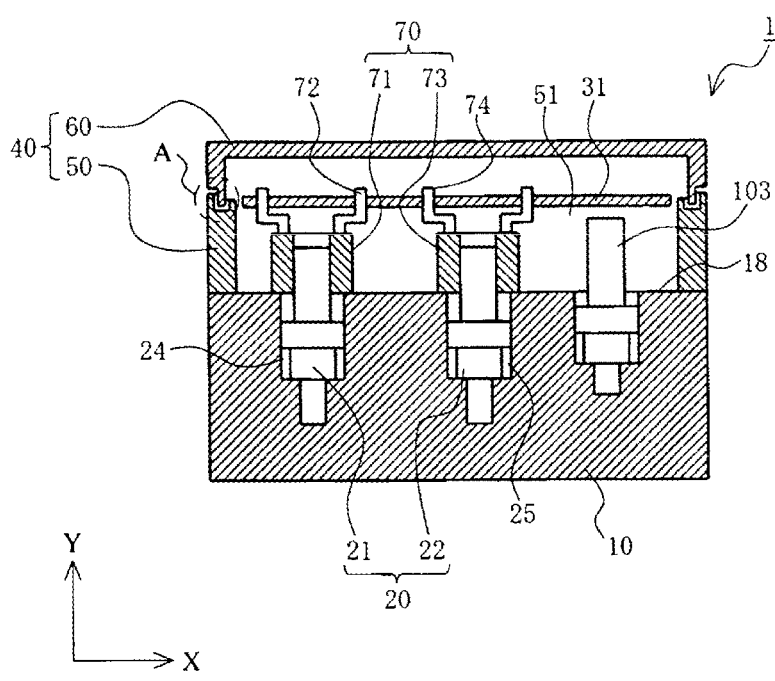
[FIG. 4]
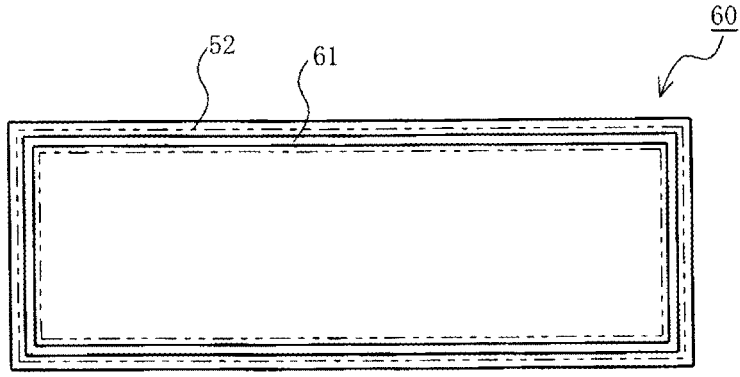

[FIG. 5]
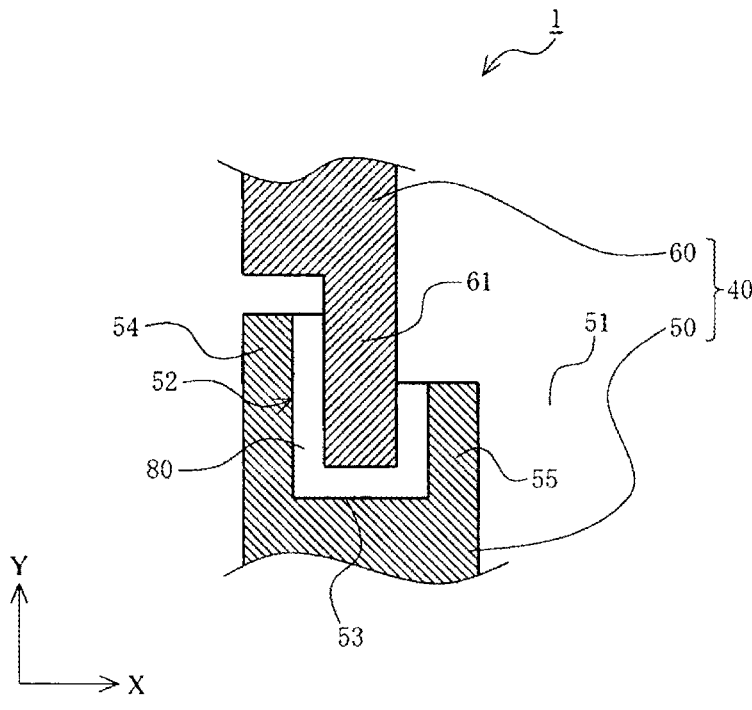
[FIG. 6]
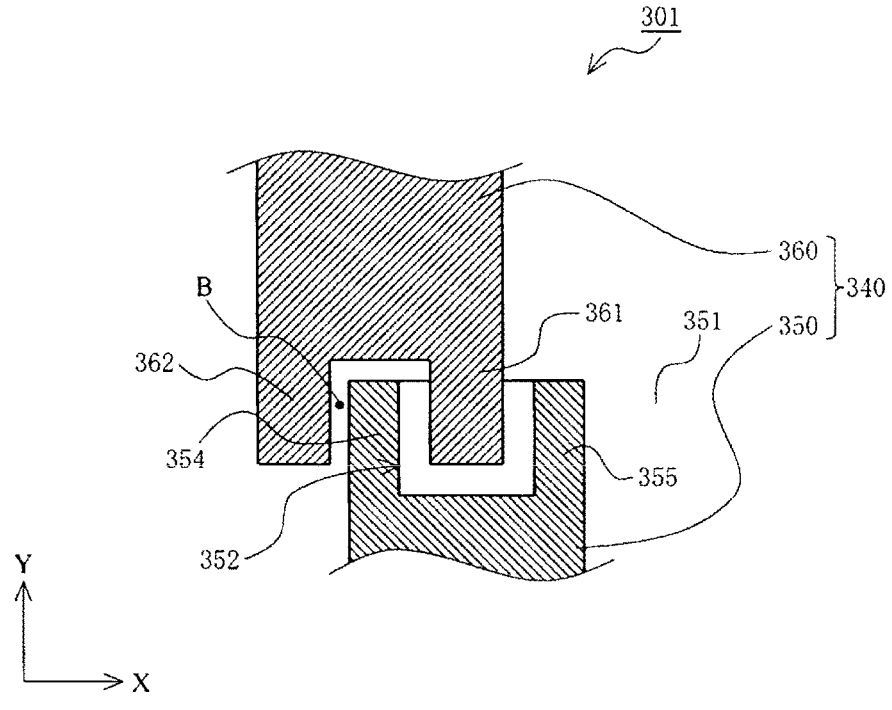

[FIG. 7]
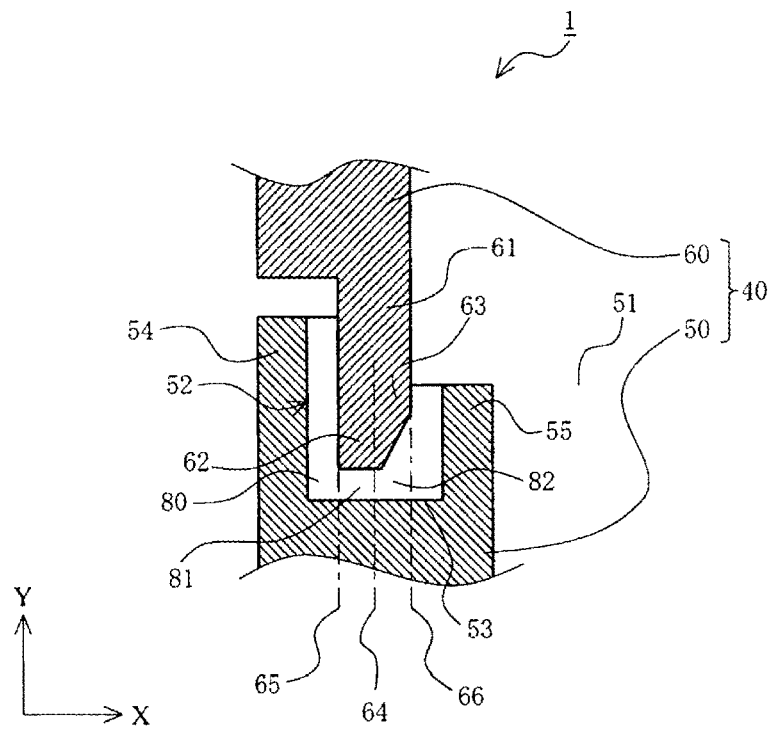
[FIG. 8]
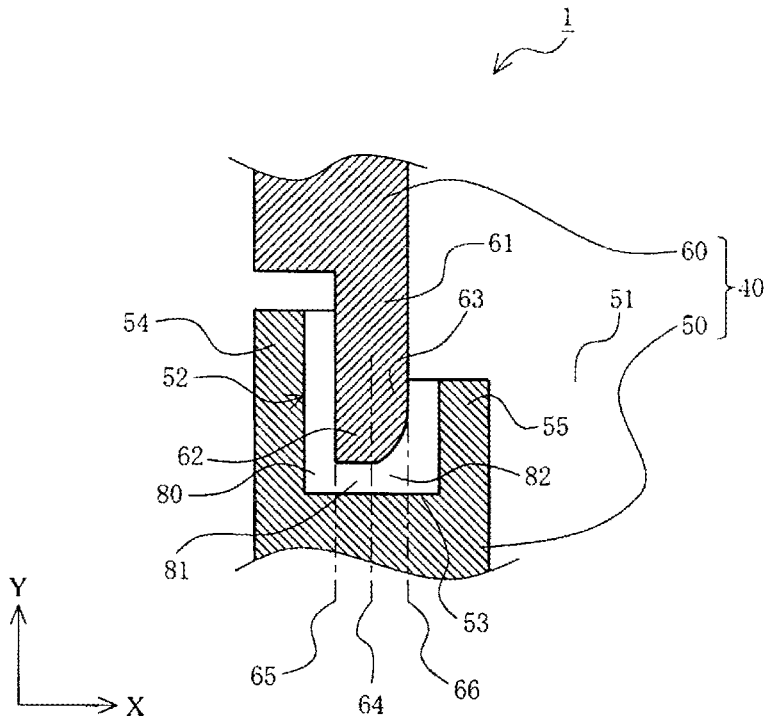

[FIG. 9]
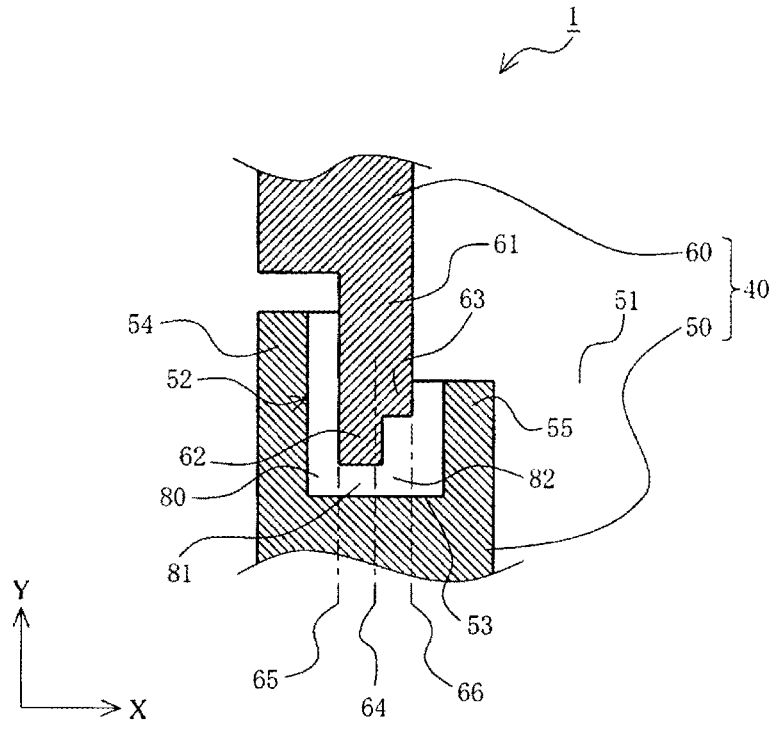
[FIG. 10]
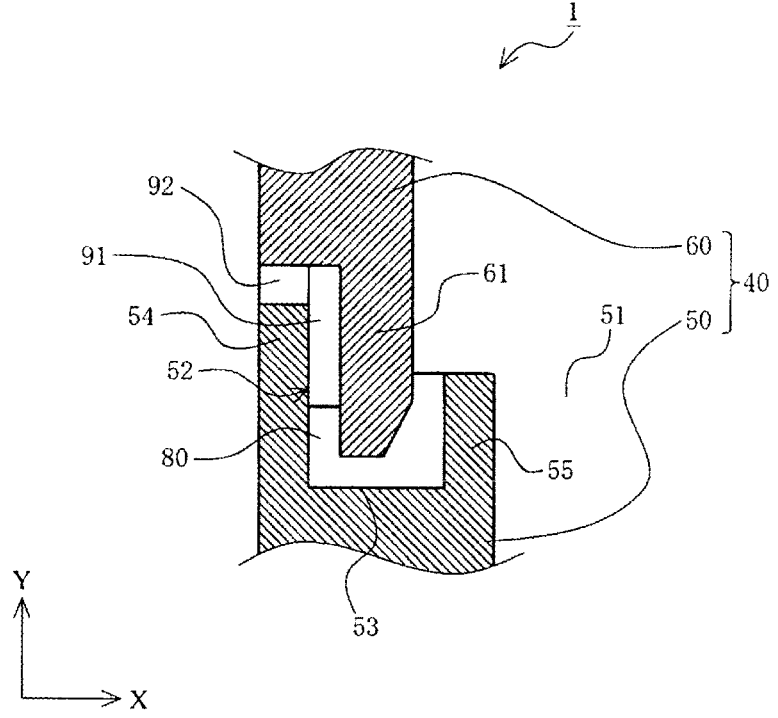

[FIG. 11]
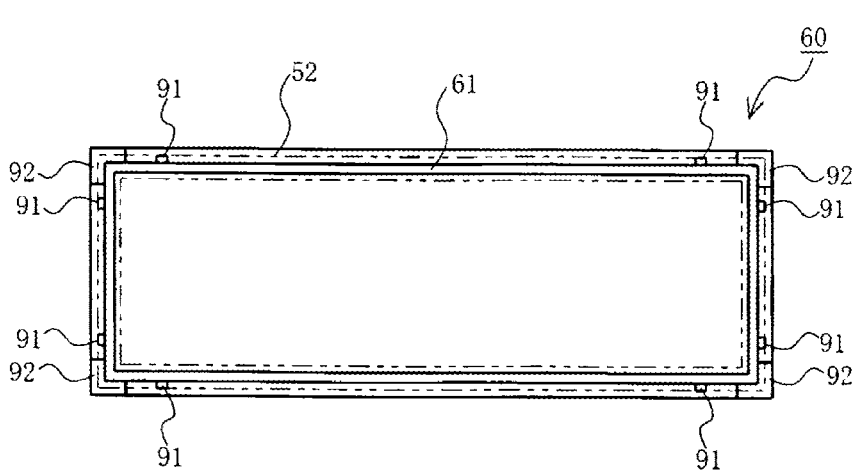

BRAKE FLUID PRESSURE CONTROL DEVICE AND SADDLE-TYPE VEHICLE

BACKGROUND

The present invention relates to a brake fluid pressure control device for a saddle-type vehicle and a saddle-type vehicle including the brake fluid pressure control device.

Among vehicles such as conventional saddle-type vehicles, there is known one including a brake fluid pressure control device for executing an anti-lock braking operation of a brake system. This brake fluid pressure control device adjusts a braking force generated in a vehicle wheel by increasing and decreasing a pressure of a brake fluid in a brake fluid circuit while an occupant of a vehicle operates an input unit such as a brake lever. As such a brake fluid pressure control device, there is known one obtained by unitizing a flow path constituting a part of the brake fluid circuit, a coil driving a hydraulic pressure adjusting valve opening and closing the flow path, a circuit board controlling energization of the coil, and the like.

Specifically, the unitized brake fluid pressure control device includes a base body to which a flow path for a brake fluid is formed, a coil which is erected on the base body and drives a hydraulic pressure adjusting valve opening and closing the flow path for the brake fluid, a circuit board which controls energization of the coil, and a housing which is connected to the base body and covers the coil and the circuit board. Further, the housing includes a main body portion and a lid. The main body portion is connected to the base body. Further, the main body portion is provided with an opening portion used when accommodating the circuit board and the like in the housing. The lid is attached to the main body portion and covers the opening portion of the main body portion (for example, see JP-A-2014-069779).

In the unitized conventional brake fluid pressure control device, there is also proposed one which improves the airtightness between the main body portion and the lid of the housing in order to suppress moisture or the like from entering the housing from between the main body portion and the lid. Specifically, the conventional brake fluid pressure control device which improves the airtightness between the main body portion and the lid of the housing has the following configuration. The main body portion includes a groove portion which is formed on the outer peripheral side of the opening portion to open toward the lid. On the other hand, the lid includes an insertion wall which extends toward the main body portion and is inserted into the groove portion. Then, a gap between the groove portion and the insertion wall is sealed by a sealing material.

Here, in the conventional brake fluid pressure control device which improves the airtightness between the main body portion and the lid of the housing, when attaching the lid to the main body portion, the sealing material is charged into the groove portion of the main body portion and then the insertion wall of the lid is inserted into the groove portion. At this time, the sealing material charged in the groove portion may leak to the outside of the outer peripheral wall of the groove portion when inserting the insertion wall of the lid into the groove portion. In other words, the sealing material charged in the groove portion may leak to the outside of the brake fluid pressure control device when inserting the insertion wall of the lid into the groove portion. Therefore, in the conventional brake fluid pressure control device which improves the airtightness between the main body portion and the lid of the housing, there is also provided one that suppresses the sealing material from leaking to the outside of the brake fluid pressure control device by providing a wall portion surrounding the outside of the outer peripheral wall of the groove portion (a position where the sealing material leaks to the outside of the brake fluid pressure control device) to the lid.

As described above, the conventional brake fluid pressure control device which improves the airtightness between the main body portion and the lid of the housing and suppresses the sealing material from leaking to the outside of the brake fluid pressure control device increases in size in the direction perpendicular to the facing direction between the main body portion and the lid by the amount of the wall portion disposed on the outer peripheral side of the main body portion. Therefore, it was difficult to decrease the size of the conventional brake fluid pressure control device which improves the airtightness between the main body portion and the lid of the housing and suppresses the sealing material from leaking to the outside of the brake fluid pressure control device.

SUMMARY

The invention has been made in view of the above-described circumstances and an object of the invention is to provide a brake fluid pressure control device capable of improving airtightness between a main body portion and a lid of a housing, suppressing a sealing material from leaking to the outside of the brake fluid pressure control device, and having a smaller size than the conventional one. Further, another object of the invention is to provide a saddle-type vehicle including such a brake fluid pressure control device.

A brake fluid pressure control device according to the invention is a brake fluid pressure control device for a saddle-type vehicle, including: a base body to which a flow path for a brake fluid is formed; a coil which is erected on the base body and drives a hydraulic pressure adjusting valve opening and closing the flow path; a circuit board which controls energization of the coil; and a housing which is connected to the base body and covers the coil and the circuit board, wherein the housing includes a main body portion which is connected to the base body and is provided with an opening portion and a lid which covers the opening portion and is attached to the main body portion, wherein the main body portion includes a groove portion which is formed on an outer peripheral side of the opening portion to open toward the lid, wherein the lid includes an insertion wall which extends toward the main body portion and is inserted into the groove portion, wherein a gap between the groove portion and the insertion wall is sealed by a sealing material, wherein the groove portion includes a bottom portion, an outer peripheral wall which constitutes an outer peripheral wall of the groove portion and extends from the bottom portion toward the lid, and an inner peripheral wall which constitutes an inner peripheral wall of the groove portion and extends from the bottom portion toward the lid, wherein a space for storing the sealing material is formed between the outer peripheral wall and the insertion wall and between the inner peripheral wall and the insertion wall, and wherein when a facing direction between the main body portion and the lid is a first direction, a length of the outer peripheral wall in the first direction is longer than a length of the inner peripheral wall in the first direction.

Further, a saddle-type vehicle according to the invention includes the brake fluid pressure control device according to the invention.

In the brake fluid pressure control device according to the invention, the length of the outer peripheral wall of the groove portion in the first direction (the length in the facing direction between the main body portion and the lid) is longer than the length of the inner peripheral wall of the groove portion in the first direction. Therefore, in the brake fluid pressure control device according to the invention, it is possible to store the sealing material leaking to the outside of the brake fluid pressure control device in the conventional brake fluid pressure control device between the insertion wall and the outer peripheral wall of the groove portion. That is, in the brake fluid pressure control device according to the invention, it is possible to suppress the sealing material from leaking to the outside of the brake fluid pressure control device even when the wall portion provided in the lid of the conventional brake fluid pressure control device in order to suppress the sealing material from leaking to the outside of the brake fluid pressure control device is not provided. Therefore, the brake fluid pressure control device according to the invention can suppress the sealing material from leaking to the outside of the brake fluid pressure control device while suppressing an increase in size of the brake fluid pressure control device in the direction perpendicular to the facing direction between the main body portion and the lid.

Here, in the brake fluid pressure control device, the housing accommodates the coil driving the hydraulic pressure adjusting valve and the circuit board controlling the energization of the coil. Therefore, the housing of the brake fluid pressure control device originally requires a certain degree of length in the facing direction between the main body portion and the lid. Thus, even when the length of the outer peripheral wall of the groove portion in the first direction is longer than the length of the inner peripheral wall of the groove portion in the first direction, the brake fluid pressure control device according to the invention does not increase in size in the facing direction between the main body portion and the lid compared to the conventional brake fluid pressure control device.

Therefore, the brake fluid pressure control device according to the invention can be decreased in size compared to the conventional brake fluid pressure control device which improves the airtightness between the main body portion and the lid of the housing and suppresses the sealing material from leaking to the outside of the brake fluid pressure control device.

BRIEF DESCRIPTION OF THE DRAWINGS

FIG. 1 is a view showing a schematic configuration of a bicycle to which a brake system including a brake fluid pressure control device according to an embodiment of the invention is installed.

FIG. 2 is a view showing a schematic configuration of the brake system according to the embodiment of the invention.

FIG. 3 is a cross-sectional view of a brake fluid pressure control device according to the embodiment of the invention.

FIG. 4 is a view in which a lid of a housing of the brake hydraulic pressure control device according to the embodiment of the invention is viewed from a main body portion side of the housing.

FIG. 5 is an enlarged view of an A part of FIG. 3.

FIG. 6 is a main cross-sectional view showing the periphery of a groove portion of a main body portion of a housing in a conventional brake hydraulic pressure control device.

FIG. 7 is a main cross-sectional view showing the periphery of a groove portion of a main body portion of a housing of a modified example of the brake fluid pressure control device according to the embodiment of the invention.

FIG. 8 is a view showing an example of another shape of an insertion wall in a modified example of the brake fluid pressure control device according to the embodiment of the invention.

FIG. 9 is a view showing an example of another shape of an insertion wall in a modified example of the brake fluid pressure control device according to the embodiment of the invention.

FIG. 10 is a main cross-sectional view showing the periphery of a groove portion of a main body portion of a housing in a modified example of the brake fluid pressure control device according to the embodiment of the invention.

FIG. 11 is a view in which a lid of the housing of the brake hydraulic pressure control device shown in FIG. 10 is viewed from the main body portion side of the housing.

DETAILED DESCRIPTION

Hereinafter, a brake fluid pressure control device and a saddle-type vehicle according to the invention will be described with reference to the drawings.

Hereinafter, a case will be described in which the invention is applied to a bicycle (for example, a two-wheeled vehicle, a three-wheeled vehicle, or the like), but the invention may be applied to a saddle-type vehicle other than the bicycle. The saddle-type vehicle other than the bicycle is, for example, a motorcycle, a tricycle, a buggie, or the like which is driven by at least one of an engine and an electric motor. Further, the bicycle means all vehicles that can be propelled on a road by a pedaling force applied to pedals. That is, the bicycle includes an ordinary bicycle, an electrically power assisted bicycle, an electric bicycle, and the like. Further, the motorcycle or the tricycle means a so-called motorcycle, and the motorcycle includes a motorcycle, a scooter, an electric scooter, and the like.

Further, the configuration, operation, and the like described below are examples, and the brake fluid pressure control device and the saddle-type vehicle according to the invention are not limited to such configurations, operations, and the like. For example, hereinafter, a case will be described in which the brake fluid pressure control device according to the invention is of a pumpless type, but the brake fluid pressure control device according to the invention may include a pump that assists the flow of the brake fluid. Further, hereinafter, a case will be described in which the brake system including the brake fluid pressure control device according to the invention executes anti-lock braking control only for the braking force generated on the front wheels. However, the brake system including the brake fluid pressure control device according to the invention may execute anti-lock braking control only for the braking force generated on the rear wheels or may execute anti-lock braking control for both the braking force generated on the front wheel and the braking force generated on the rear wheels.

Further, in each figure, the same or similar members or parts are designated by the same reference numerals or the reference numerals are omitted. For detailed structures, the illustrations are simplified or omitted as appropriate. Further, duplicate descriptions are simplified or omitted as appropriate.

<Installation of Brake System Including Brake Fluid Pressure Control Device on Bicycle>

An installation of the brake system including the brake fluid pressure control device according to this embodiment on the bicycle will be described.

FIG. 1 is a view showing a schematic configuration of a bicycle to which a brake system including a brake fluid pressure control device according to an embodiment of the invention is installed. Additionally, in FIG. 1, a case is shown in which a bicycle 200 is a two-wheeled vehicle, but the bicycle 200 may be another bicycle such as a tricycle.

The bicycle 200 which is an example of the saddle-type vehicle includes a frame 210, a turning portion 230, a saddle 218, a pedal 219, a rear wheel 220, and a rear wheel brake 260.

The frame 210 includes, for example, a head tube 211 which axially supports a steering column 231 of the turning portion 230, a top tube 212 and a down tube 213 which are connected to the head tube 211, a seat tube 214 which is connected to the top tube 212 and the down tube 213 and holds the saddle 218, and a stay 215 which is connected to the upper and lower ends of the seat tube 214 and holds the rear wheel 220 and the rear wheel brake 260.

The turning portion 230 includes the steering column 231, a handle stem 232 which is held by the steering column 231, a handle bar 233 which is held by the handle stem 232, a braking operation portion 240 which is attached to the handle bar 233, a front fork 216 which is connected to the steering column 231, a front wheel 217 which is rotatably held by the front fork 216, and a front wheel brake 250. The front fork 216 is provided on both sides of the front wheel 217. One end of the front fork 216 is connected to the steering column 231 and the other end thereof is connected to the rotation center of the front wheel 217.

The braking operation portion 240 includes a mechanism which is used as an operation portion of the front wheel brake 250 and a mechanism which is used as an operation portion of the rear wheel brake 260. For example, the mechanism which is used as the operation portion of the front wheel brake 250 is disposed on the right end side of the handle bar 233 and the mechanism which is used as the operation portion of the rear wheel brake 260 is disposed on the left end side of the handle bar 233.

The bicycle 200 with such a configuration includes a brake fluid pressure control device 1. In this embodiment, the brake fluid pressure control device 1 is attached to the front fork 216 of the turning portion 230. The brake fluid pressure control device 1 is a unit which is in charge of controlling the hydraulic pressure of the brake fluid of the front wheel brake 250. Additionally, the rear wheel brake 260 may be a brake of a type that generates a braking force by increasing the hydraulic pressure of the brake fluid or a brake of a type that mechanically generates a braking force (for example, a brake of a type that generates a braking force by causing a tension in a wire).

Further, the bicycle 200 includes a power unit 270 which is a power supply of the brake fluid pressure control device 1. The power unit 270 is attached to, for example, the down tube 213 of the frame 210. The power unit 270 may be a battery or a generator. The generator includes, for example, a generator which generates power by the running of the bicycle 200 (for example, a hub generator which generates power by the rotation of the front wheel 217 or the rear wheel 220, a generator which is a motor of a drive source of the front wheel 217 or the rear wheel 220 and generates regenerative power, and the like), a generator which generates power by sun light, and the like.

That is, the brake system 100 including at least the braking operation portion 240, the front wheel brake 250, the brake fluid pressure control device 1, and the power unit 270 is installed to the bicycle 200. The brake system 100 can execute anti-lock braking control by controlling the hydraulic pressure of the brake fluid of the front wheel brake 250 using the brake fluid pressure control device 1.

<Configuration of Brake System>

A configuration of the brake system according to the embodiment will be described.

FIG. 2 is a view showing a schematic configuration of the brake system according to the embodiment of the invention.

The brake fluid pressure control device 1 includes a base body 10. The base body 10 is provided with a master cylinder port 11, a wheel cylinder port 12, and a flow path 13 which allows the master cylinder port 11 and the wheel cylinder port 12 to communicate with each other.

The flow path 13 is a flow path of the brake fluid. The flow path 13 includes a first flow path 14, a second flow path 15, a third flow path 16, and a fourth flow path 17. The master cylinder port 11 and the wheel cylinder port 12 communicate with each other through the first flow path 14 and the second flow path 15. Further, an inlet side end portion of the third flow path 16 is connected to the middle portion of the second flow path 15.

The braking operation portion 240 is connected to the master cylinder port 11 through a liquid pipe 101. The braking operation portion 240 includes a brake lever 241, a master cylinder 242, and a reservoir 243. The master cylinder 242 includes a piston portion (not shown) which moves in conjunction with the user's operation for the brake lever 241 and is connected to the inlet side of the first flow path 14 through the liquid pipe 101 and the master cylinder port 11. By the movement of the piston portion, the hydraulic pressure of the brake fluid of the first flow path 14 increases or decreases. Further, the reservoir 243 can store the brake fluid of the master cylinder 242.

The front wheel brake 250 is connected to the wheel cylinder port 12 through a liquid pipe 102. The front wheel brake 250 includes a wheel cylinder 251 and a rotor 252. The wheel cylinder 251 is attached to the lower end portion of the front fork 216. The wheel cylinder 251 includes a piston portion (not shown) which moves in conjunction with the hydraulic pressure of the liquid pipe 102 and is connected to the outlet side of the second flow path 15 through the liquid pipe 102 and the wheel cylinder port 12. The rotor 252 is held by the front wheel 217 and rotates together with the front wheel 217. A brake pad (not shown) is pressed against the rotor 252 by the movement of the piston portion, thereby braking the front wheel 217.

Further, the brake fluid pressure control device 1 includes a hydraulic pressure adjusting valve 20 which opens and closes the flow path 13 and coils 70 which drive the hydraulic pressure adjusting valve 20. In this embodiment, the brake fluid pressure control device 1 includes an inlet valve 21 and an outlet valve 22 as the hydraulic pressure adjusting valve 20. The inlet valve 21 is provided between the outlet side of the first flow path 14 and the inlet side of the second flow path 15 and enables and disables the flow of the brake fluid between the first flow path 14 and the second flow path 15. The outlet valve 22 is provided between the outlet side of the third flow path 16 and the inlet side of the fourth flow path 17 and enables and disables the flow of the brake fluid between the third flow path 16 and the fourth flow path 17. By the opening and closing operations of the inlet valve 21 and the outlet valve 22, the hydraulic pressure of the brake fluid is controlled.

Further, in this embodiment, the brake fluid pressure control device 1 includes a coil 71 which drives the inlet valve 21 and a coil 73 which drives the outlet valve 22 as the coils 70. For example, when the coil 71 is in the non-energized state, the inlet valve 21 enables the flow of the brake fluid in both directions. Then, when the coil 71 is in the energized state, the inlet valve 21 is closed and disables the flow of the brake fluid. That is, in this embodiment, the inlet valve 21 is a solenoid valve which is opened in the non-energized state. Further, for example, when the coil 73 is in the non-energized state, the outlet valve 22 disables the flow of the brake fluid. Then, when the coil 73 is energized, the outlet valve 22 is opened to enable the flow of the brake fluid in both directions. That is, in this embodiment, the outlet valve 22 is a solenoid valve which is closed in the non-energized state.

Further, the brake fluid pressure control device 1 includes an accumulator 23. The accumulator 23 is connected to the outlet side of the fourth flow path 17 and stores the brake fluid having passed through the outlet valve 22.

Further, the brake fluid pressure control device 1 includes a hydraulic pressure sensor 103 for detecting the hydraulic pressure of the brake fluid of the wheel cylinder 251. The hydraulic pressure sensor 103 is provided to the second flow path 15 or the third flow path 16.

Further, the brake fluid pressure control device 1 includes a control unit 30. Signals of various sensors such as the hydraulic pressure sensor 103 and a vehicle wheel speed sensor (not shown) for detecting the rotation speed of the front wheel 217 are input to the control unit 30. Additionally, each part of the control unit 30 may be arranged together or dispersedly. For example, the control unit 30 may be configured to include a microcomputer, a microprocessor unit, and the like, may be configured to include an updatable one such as firmware, or may be configured to include a program module or the like executed by an instruction from a CPU and the like.

The control unit 30 controls the energization of the coil 71 and the coil 73. Specifically, the control unit 30 controls the driving (opening and closing operation) of the inlet valve 21 by controlling the energization of the coil 71. Further, the control unit 30 controls the driving (opening and closing operation) of the outlet valve 22 by controlling the energization of the coil 73. That is, the control unit 30 controls the hydraulic pressure of the brake fluid of the wheel cylinder 251, that is, the braking force of the front wheel 217 by controlling the opening and closing operation of the inlet valve 21 and the outlet valve 22.

Additionally, in this embodiment, at least the configuration for controlling the energization of the coil 71 and the coil 73 among the configurations of the control unit 30 is configured by a circuit board 31 described later. That is, the circuit board 31 controls the driving of the inlet valve 21 and the outlet valve 22 by controlling the energization of the coil 71 and the coil 73.

For example, if it is determined that the front wheel 217 is locked or may be locked from the signal of the vehicle wheel speed sensor (not shown) when the front wheel 217 is braked by the user's operation of the brake lever 241, the control unit 30 starts anti-lock braking control.

If the anti-lock braking control starts, the control unit 30 suppresses an increase in pressure of the brake fluid of the wheel cylinder 251 by disabling the flow of the brake fluid from the master cylinder 242 to the wheel cylinder 251 in such a manner that the coil 71 is energized and the inlet valve 21 is closed. On the other hand, the control unit 30 decreases the pressure of the brake fluid of the wheel cylinder 251 by enabling the flow of the brake fluid from the wheel cylinder 251 to the accumulator 23 in such a manner that the coil 73 is energized and the outlet valve 22 is opened. Accordingly, the lock of the front wheel 217 is released or avoided. If it is determined that the brake fluid of the wheel cylinder 251 is depressurized to a predetermined value from the signal of the hydraulic pressure sensor 103, the control unit 30 does not energize the coil 73 to close the outlet valve 22 and does not energize the coil 71 to open the inlet valve 21 for a short period of time so that the pressure of the brake fluid of the wheel cylinder 251 increases and decreases. The control unit 30 may increase and decrease the pressure of the wheel cylinder 251 only once or a plurality of times in a repeated manner.

If the anti-lock braking control ends and the brake lever 241 is returned, the inside of the master cylinder 242 enters an atmospheric pressure state and the brake fluid in the wheel cylinder 251 is returned. Further, the outlet valve 22 is opened when the anti-lock braking control ends and the brake lever 241 is returned. If the pressure of the brake fluid in the flow path 13 becomes lower than the pressure of the brake fluid stored in the accumulator 23, the brake fluid stored in the accumulator 23 is discharged to the outside of the accumulator 23 without boosting (that is, without pump), is returned to the flow path 13, and is eventually returned to the master cylinder 242.

<Configuration of Brake Fluid Pressure Control Device>

The brake fluid pressure control device 1 includes the base body 10, the coils 70, the circuit board 31, and a housing 40. Hereinafter, a configuration of the brake fluid pressure control device 1 according to this embodiment will be described.

FIG. 3 is a cross-sectional view of the brake fluid pressure control device according to the embodiment of the invention. Specifically, the housing 40 of the brake fluid pressure control device 1 includes a main body portion 50 and a lid 60. As will be described later, the main body portion 50 includes a groove portion 52 and the lid 60 includes an insertion wall 61 which is inserted into the groove portion 52. FIG. 3 is a cross-sectional view in which the housing 40 is cut in a virtual plane which is parallel to a first direction corresponding to the facing direction between the main body portion 50 and the lid 60 and passes through the insertion wall 61, an outer peripheral wall 54 of the groove portion 52, and an inner peripheral wall 55 of the groove portion 52. Hereinafter, the first direction which is the facing direction between the main body portion 50 and the lid 60 is set as a first direction Y. Further, in the cross-sectional view shown in FIG. 3, a direction perpendicular to the first direction Y is set as a second direction X.

Further, FIG. 4 is a view in which the lid of the housing of the brake hydraulic pressure control device according to the embodiment of the invention is viewed from the main body portion side of the housing. Additionally, in FIG. 4, the shape of the opening portion of the groove portion 52 of the main body portion 50 is indicated by a two-dotted chain line which is an imaginary line.

The base body 10 is, for example, a substantially rectangular parallelepiped member made of an aluminum alloy. Each surface of the base body 10 may be flat or may include a curved portion or a step. The coil 71 and the coil 73 which are the coils 70 are erected on the surface 18 of the base body 10.

Specifically, as described above, the brake fluid pressure control device 1 according to this embodiment includes the inlet valve 21 and the outlet valve 22 as the hydraulic pressure adjusting valve 20. On the other hand, a recess portion 24 and a recess portion 25 are formed in the base body 10. In the recess portion 24, the outlet side of the first flow path 14 and the inlet side of the second flow path 15 communicate with each other and the inlet valve 21 is movably provided. Then, the flow of the brake fluid between the first flow path 14 and the second flow path 15 is enabled and disabled when the inlet valve 21 moves in the recess portion 24. Further, in the recess portion 25, the outlet side of the third flow path 16 and the inlet side of the fourth flow path 17 communicate with each other and the outlet valve 22 is movably provided. Then, the flow of the brake fluid between the third flow path 16 and the fourth flow path 17 is enabled and disabled when the outlet valve 22 moves in the recess portion 25. In a state in which the inlet valve 21 is provided to the recess portion 24, a part of the inlet valve 21 protrudes from the surface 18 toward the outside of the base body 10. The coil 71 which drives the inlet valve 21 is erected on the surface 18 of the base body 10 to surround the protruding portion of the inlet valve 21. Similarly, a part of the outlet valve 22 protrudes from the surface 18 toward the outside of the base body 10 in a state in which the outlet valve 22 is provided in the recess portion 25. The coil 73 which drives the outlet valve 22 is erected on the surface 18 of the base body 10 to surround the protruding portion of the outlet valve 22.

The circuit board 31 which controls the energization of the coil 71 and the coil 73 is electrically connected to the coil 71 and the coil 73. In this embodiment, the circuit board 31 is electrically connected to the coil 71 via a connection terminal 72 and is electrically connected to the coil 73 via a connection terminal 74.

The housing 40 is connected to the base body 10 to cover the coil 70 and the circuit board 31. In this embodiment, the housing 40 is connected to the surface 18 of the base body 10. Further, the brake fluid pressure control device 1 according to this embodiment includes the hydraulic pressure sensor 103 as described above. In this embodiment, the hydraulic pressure sensor 103 is also covered by the housing 40.

This housing 40 includes the main body portion 50 and the lid 60 as described above. The main body portion 50 is connected to the housing 40. Further, an opening portion 51 is formed in the main body portion 50. The opening portion 51 is used, for example, when accommodating the circuit board 31 and the like in the housing 40. In this embodiment, the opening portion 51 has, for example, a substantially square shape and is formed at a position facing the circuit board 31. The lid 60 covers the opening portion 51 and is attached to the main body portion 50. In order to prevent moisture or the like from entering the housing 40 from between the main body portion 50 and the lid 60, the housing 40 improves the airtightness between the main body portion 50 and the lid 60 by the following configuration.

FIG. 5 is an enlarged view of an A part of FIG. 3. In FIG. 5, the left side of the paper is the outside of the housing 40 and the right side of the paper is the inside of the housing 40. That is, in FIG. 5, the left side of the paper is the outside of the brake fluid pressure control device 1.

The main body portion 50 includes the groove portion 52 which is formed on the outer peripheral side of the opening portion 51 to open toward the lid 60. As shown in FIG. 4, in this embodiment, the shape of the opening portion of the groove portion 52 corresponds to the shape of the opening portion 51 when viewed from the side of the lid 60 and has a substantially square frame shape. This groove portion 52 includes a bottom portion 53, the outer peripheral wall 54 which constitutes the outer peripheral wall of the groove portion 52 and extends from the bottom portion 53 toward the lid 60, and the inner peripheral wall 55 which constitutes the inner peripheral wall of the groove portion 52 and extends from the bottom portion 53 toward the lid 60. Further, the length of the outer peripheral wall 54 in the first direction Y is longer than the length of the inner peripheral wall 55 in the first direction Y.

On the other hand, the lid 60 includes the insertion wall 61 which extends toward the main body portion 50 and is inserted into the groove portion 52. As shown in FIG. 4, in this embodiment, the shape of the insertion wall 61 corresponds to the shape of the groove portion 52 when viewed from the side of the main body portion 50 and has a substantially square frame shape. In a state in which the insertion wall 61 is inserted into the groove portion 52, a space 80 is formed between the outer peripheral wall 54 and the insertion wall 61 and between the inner peripheral wall 55 and the insertion wall 61. This space 80 is a space which stores a sealing material. Then, the housing 40 according to this embodiment improves the airtightness between the main body portion 50 and the lid 60 by sealing a gap between the groove portion 52 and the insertion wall 61 with the sealing material stored in the space 80. Additionally, in this embodiment, the space 80 for storing the sealing material is also formed between the insertion wall 61 and the bottom portion 53 of the groove portion 52.

The housing 40 with such a configuration first charges the sealing material into the groove portion 52 of the main body portion 50 when attaching the lid 60 to the main body portion 50. Then, the insertion wall 61 of the lid 60 is inserted into the groove portion 52 charged with the sealing material. Accordingly, the sealing material in the groove portion 52 is pressed by the insertion wall 61 to flow between the outer peripheral wall 54 and the insertion wall 61 and between the inner peripheral wall 55 and the insertion wall 61. Then, the sealing material is stored between the outer peripheral wall 54 and the insertion wall 61 and between the inner peripheral wall 55 and the insertion wall 61 and a gap between the groove portion 52 and the insertion wall 61 is sealed by the sealing material.

Incidentally, also in the housing of the conventional brake hydraulic pressure control device, the airtightness between the main body portion and the lid is improved by the groove portion provided to the main body portion and the insertion wall provided to the lid and inserted into the groove portion of the main body portion. Hereinafter, the conventional brake fluid pressure control device including such a housing will be described. When describing the conventional brake fluid pressure control device below, the same configuration as the configuration of the brake fluid pressure control device 1 according to this embodiment will be described by adding "300" to the reference numeral of the configuration of the brake fluid pressure control device 1 according to this embodiment.

FIG. 6 is a main cross-sectional view showing the periphery of the groove portion of the main body portion of the housing of the conventional brake hydraulic pressure control device. FIG. 6 is a view in which a conventional brake fluid pressure control device 301 is cut in the same cross-section as that of FIG. 3 and the same position as that of the A part of FIG. 3 is observed. Therefore, in FIG. 6, the left side of the paper is the outside of a conventional housing 340 and the right side of the paper is the inside of the conventional housing 340. That is, in FIG. 6, the left side of the paper is the outside of the conventional brake fluid pressure control device 301.

Similarly to the main body portion 50 according to this embodiment, a main body portion 350 of the housing 340 of the conventional brake fluid pressure control device 301 includes a groove portion 352 which is formed on the outer peripheral side of the opening portion 351 to open toward a lid 360 of the housing 340. Here, the groove portion 352 is different from the groove portion 52 according to this embodiment in that the length of an outer peripheral wall 354 in the first direction Y is not longer than the length of an inner peripheral wall 355 in the first direction Y. Further, similarly to the lid 60 according to this embodiment, the lid 360 of the housing 340 of the conventional brake fluid pressure control device 301 includes an insertion wall 361 which extends toward the main body portion 350 and is inserted into the groove portion 352. Further, in a state in which the insertion wall 361 is inserted into the groove portion 352, a space for storing a sealing material is formed between the outer peripheral wall 354 and the insertion wall 361 and between the inner peripheral wall 355 and the insertion wall 361.

For the attachment of the lid 360 to the main body portion 350, the sealing material is charged into the groove portion 352 of the main body portion 350 similarly to the housing 40 according to this embodiment. Then, the insertion wall 361 of the lid 360 is inserted into the groove portion 352 charged with the sealing material. Here, when the space is formed in both between the outer peripheral wall 354 and the insertion wall 361 and between the inner peripheral wall 355 and the insertion wall 361, the amount of the sealing material flowing toward the outer peripheral wall 354 and the amount of the sealing material flowing toward the inner peripheral wall 355 become different depending on the insertion position and the insertion depth of the insertion wall 361 into the groove portion 352. That is, the amount of the sealing material flowing toward the outer peripheral wall 354 may be larger than the expected amount depending on the insertion position and the insertion depth of the insertion wall 361 into the groove portion 352.

At this time, as described above, in the housing 340 of the conventional brake fluid pressure control device 301, the length of the outer peripheral wall 354 in the first direction Y is not longer than the length of the inner peripheral wall 355 in the first direction Y. Therefore, in the conventional brake fluid pressure control device 301, if the amount of the sealing material flowing toward the outer peripheral wall 354 increases, the sealing material charged in the groove portion 352 may leak to the outside of the outer peripheral wall 354 (for example, a B part shown in FIG. 6). Therefore, in the conventional brake fluid pressure control device 301, a wall portion 362 which surrounds the outside of the outer peripheral wall 354 is provided to the lid in order to suppress the sealing material from leaking to the outside of the brake fluid pressure control device 301. Therefore, it is difficult to realize a decrease in size since the conventional brake fluid pressure control device 301 increases in size in the second direction X by the amount of the wall portion 362.

On the other hand, in the brake fluid pressure control device 1 according to this embodiment, as described above, the groove portion 52 of the main body portion 50 of the housing is formed such that the length of the outer peripheral wall 54 in the first direction Y is longer than the length of the inner peripheral wall 55 in the first direction Y. Therefore, in the brake fluid pressure control device 1 according to this embodiment, even when the amount of the sealing material flowing toward the outer peripheral wall 54 increases, the sealing material leaking to the outside of the outer peripheral wall 354 in the conventional brake fluid pressure control device 301 can be stored between the insertion wall 61 and the outer peripheral wall 54 of the groove portion 52. That is, in the brake fluid pressure control device 1 according to this embodiment, it is possible to suppress the sealing material from leaking to the outside of the brake fluid pressure control device 1 even when the wall portion 362 of the lid 360 of the conventional brake fluid pressure control device 301 is not provided. Therefore, the brake fluid pressure control device 1 according to this embodiment can suppress the sealing material from leaking to the outside of the brake fluid pressure control device 1 while suppressing an increase in size in the second direction X.

Here, conventionally, the brake fluid pressure control device is formed such that the housing accommodates the coil for driving the hydraulic pressure adjusting valve and the circuit board controlling the energization of the coil. Therefore, the housing of the brake fluid pressure control device originally requires a certain length in the direction in which the main body portion and the lid face each other. Thus, even when the length of the outer peripheral wall 54 in the first direction Y is longer than the length of the inner peripheral wall 55 in the first direction Y as in this embodiment, the brake fluid pressure control device 1 according to this embodiment does not increase in size in the first direction Y compared to the conventional brake fluid pressure control device.

Therefore, the brake fluid pressure control device 1 according to this embodiment can be decreased in size compared to the conventional brake fluid pressure control device which improves the airtightness between the main body portion and the lid of the housing and suppresses the sealing material from leaking to the outside of the brake fluid pressure control device.

<Effect of Brake Fluid Pressure Control Device>

An effect of the brake fluid pressure control device according to this embodiment will be described.

The brake fluid pressure control device 1 according to this embodiment includes the base body 10 to which the flow path 13 for the brake fluid is formed, the coils 70 which are erected on the base body 10 and drives the hydraulic pressure adjusting valve 20 opening and closing the flow path 13, the circuit board 31 which controls the energization of the coils 70, and the housing which is connected to the base body 10 and covers the coil 70 and the circuit board 31. The housing 40 includes the main body portion 50 which is connected to the base body 10 and is provided with the opening portion 51 and the lid 60 which covers the opening portion 51 and is attached to the main body portion 50. The main body portion 50 includes the groove portion 52 which is formed on the outer peripheral side of the opening portion 51 to open toward the lid 60. The lid 60 includes the insertion wall 61 which extends toward the main body portion 50 and is inserted into the groove portion 52. Then, the brake fluid pressure control device 1 is formed such that a gap between the groove portion 52 and the insertion wall 61 is sealed by the sealing material and the brake fluid pressure control device 1 is, for example, a brake fluid pressure control device for a saddle-type vehicle which is the bicycle 200. The groove portion 52 includes the bottom portion 53, the outer peripheral wall 54 which constitutes the outer peripheral wall of the groove portion 52 and extends from the bottom portion 53 toward the lid 60, and the inner peripheral wall which constitutes the inner peripheral wall of the groove portion 52 and extends from the bottom portion 53 toward the lid 60. Further, the space 80 for storing the sealing material is formed between the outer peripheral wall 54 and the insertion wall 61 and between the inner peripheral wall 55 and the insertion wall 61. Further, the length of the outer peripheral wall 54 in the first direction Y is longer than the length of the inner peripheral wall 55 in the first direction Y.

In the brake fluid pressure control device 1 according to this embodiment, the length of the outer peripheral wall 54 in the first direction Y is longer than the length of the inner peripheral wall 55 in the first direction Y. Therefore, the brake fluid pressure control device 1 according to this embodiment can suppress the sealing material from leaking to the outside of the brake fluid pressure control device 1 while suppressing an increase in size in the second direction X as described above. Further, the brake fluid pressure control device 1 according to this embodiment does not increase in size in the first direction Y compared to the conventional brake fluid pressure control device as described above. Therefore, the brake fluid pressure control device 1 according to this embodiment can be decreased in size compared to the conventional brake fluid pressure control device which improves the airtightness between the main body portion and the lid of the housing and suppresses the sealing material from leaking to the outside of the brake fluid pressure control device.

Further, the brake fluid pressure control device 1 according to this embodiment does not require the wall portion 362 of the lid 360 of the conventional brake fluid pressure control device 301 as described above. This wall portion 362 may hinder the improvement of the aesthetic appearance of the brake fluid pressure control device 301. That is, the brake fluid pressure control device 1 according to this embodiment can improve the aesthetic appearance compared to the conventional brake fluid pressure control device 301 including the wall portion 362.

Preferably, the brake fluid pressure control device 1 according to this embodiment is mounted on a saddle-type vehicle such as the bicycle 200. Compared to the vehicle such as a four-wheeled vehicle, the saddle-type vehicle has a lower degree of freedom in component layout and a lower degree of freedom in installing the brake fluid pressure control device. Therefore, the brake fluid pressure control device 1 according to this embodiment which can be decreased in size compared to the conventional one is suitable when installing the brake fluid pressure control device improving the airtightness between the lid and the main body portion of the housing and suppressing the sealing material from leaking to the outside of the brake fluid pressure control device in the saddle-type vehicle. Further, in the saddle-type vehicle, the brake fluid pressure control device is easier to see from the outside than in the vehicle such as a four-wheeled vehicle. Therefore, since the brake fluid pressure control device 1 according to this embodiment capable of suppressing the sealing material from leaking to the outside of the brake fluid pressure control device is installed in the saddle-type vehicle, it is possible to suppress deterioration of the aesthetic appearance of the saddle-type vehicle.

MODIFIED EXAMPLE

FIG. 7 is a main cross-sectional view showing the periphery of a groove portion of a main body portion of a housing of a modified example of the brake fluid pressure control device according to the embodiment of the invention. FIG. 7 is a view in which the modified example of the brake fluid pressure control device 1 is cut in the same cross-section as that of FIG. 3 and the same position as that of the A part of FIG. 3 is observed. Therefore, in FIG. 7, the left side of the paper is the outside of the housing 40 and the right side of the paper is the inside of the housing That is, in FIG. 7, the left side of the paper is the outside of the modified example of the brake fluid pressure control device 1.

In FIGS. 1 to 5, the configuration between the insertion wall 61 and the bottom portion 53 of the groove portion 52 is not particularly mentioned. For example, the configuration between the insertion wall 61 and the bottom portion 53 of the groove portion 52 shown in FIG. 7 is preferable. Here, in the description of the configuration between the bottom portion 53 of the groove portion 52 and the insertion wall 61, a center line 64, an outer peripheral line 65, an inner peripheral line 66, an outer peripheral region 81, and an inner peripheral region 82 in the cross-section shown in FIG. 7 are defined as below. In a root portion 63 of an insertion region 62 located on the inside of the groove portion 52 of the insertion wall 61, a straight line passing through the center point in the second direction X and parallel to the first direction Y is set as the center line 64. A straight line passing through the point on the side closest to the outer peripheral wall 54 in the insertion region 62 and parallel to the first direction Y is set as the outer peripheral line 65. A straight line passing through the point on the side closest to the inner peripheral wall 55 in the insertion region 62 and parallel to the first direction Y is set as the inner peripheral line 66. A region surrounded by the insertion wall 61, the center line 64, the outer peripheral line 65, and the bottom portion 53 of the groove portion 52 is set as the outer peripheral region 81. A region surrounded by the insertion wall 61, the center line 64, the inner peripheral line 66, and the bottom portion 53 of the groove portion 52 is set as the inner peripheral region 82.

When the outer peripheral region 81 and the inner peripheral region 82 are defined in this way, the area of the inner peripheral region 82 is preferably larger than the area of the outer peripheral region 81. Additionally, in FIG. 7, the area of the inner peripheral region 82 is larger than the area of the outer peripheral region 81 due to the insertion region 62 formed in an asymmetrical shape with the center line 64 as the axis of symmetry. Since the area of the inner peripheral region 82 is larger than the area of the outer peripheral region 81, the pressure generated in the sealing material existing in the outer peripheral region 81 becomes larger than the pressure generated in the sealing material existing in the inner peripheral region 82 when the insertion wall 61 of the lid 60 is inserted into the groove portion 52 charged with the sealing material. As a result, the sealing material in the groove portion 52 is more likely to flow toward the inner peripheral wall 55 compared to the outer peripheral wall 54 when the insertion wall 61 is inserted into the groove portion 52 charged with the sealing material. Therefore, since the area of the inner peripheral region 82 is larger than the area of the outer peripheral region 81, it is possible to further suppress the sealing material from leaking to the outside of the brake fluid pressure control device 1.

Additionally, in the modified example of the brake fluid pressure control device 1 shown in FIG. 7, the area of the inner peripheral region 82 is larger than the area of the outer peripheral region 81 due to an inclined portion provided as a flat surface on the inner peripheral portion of the tip of the insertion wall 61. However, this shape is just an example.

FIGS. 8 and 9 are views showing an example of another shape of the insertion wall in the modified example of the brake fluid pressure control device according to the embodiment of the invention. These drawings are views in which the modified example of the brake fluid pressure control device 1 is cut in the same cross-section as that of FIG. 3 and the same position as that of the A part of FIG. 3 is observed.

Therefore, in these drawings, the left side of the paper is the outside of the housing 40 and the right side of the paper is the inside of the housing 40. That is, in these drawings, the left side of the paper is the outside of the modified example of the brake fluid pressure control device 1.

For example, as shown in FIG. 8, even when an inclined portion is formed as a curved surface on the inner peripheral portion of the tip of the insertion wall 61, the insertion region 62 can be formed in an asymmetrical shape with the center line 64 as the axis of symmetry and the area of the inner peripheral region 82 can be larger than the area of the outer peripheral region 81. Additionally, in FIG. 8, the inclined portion is formed as a curved surface to protrude toward the bottom portion 53 of the groove portion 52, but the inclined portion may be formed as a curved surface to protrude toward the side opposite to the bottom portion 53 of the groove portion 52. Even when the inclined portion is formed in this way, the insertion region 62 can be formed in an asymmetrical shape with the center line 64 as the axis of symmetry and the area of the inner peripheral region 82 can be larger than the area of the outer peripheral region 81. Further, for example, as shown in FIG. 9, even when at least one step portion is formed on the inner peripheral portion of the tip of the insertion wall 61, the insertion region 62 can be formed in an asymmetrical shape with the center line 64 as the axis of symmetry and the area of the inner peripheral region 82 can be larger than the area of the outer peripheral region 81. If the area of the inner peripheral region 82 is larger than the area of the outer peripheral region 81 regardless of the shape of the inner peripheral portion of the tip of the insertion wall 61, the sealing material in the groove portion 52 easily flows toward the inner peripheral wall 55 when the insertion wall 61 is inserted into the groove portion 52 charged with the sealing material. Accordingly, it is possible to further suppress the sealing material from leaking to the outside of the brake fluid pressure control device 1.

FIG. 10 is a main cross-sectional view showing the periphery of a groove portion of a main body portion of a housing in a modified example of the brake fluid pressure control device according to the embodiment of the invention. FIG. 10 is a view in which the modified example of the brake fluid pressure control device 1 is cut in the same cross-section as that of FIG. 3 and the same position as that of the A part of FIG. 3 is observed. Therefore, in FIG. 10, the left side of the paper is the outside of the housing 40 and the right side of the paper is the inside of the housing That is, in FIG. 10, the left side of the paper is the outside of the modified example of the brake fluid pressure control device 1.

Further, FIG. 11 is a view in which the lid of the housing of the brake hydraulic pressure control device shown in FIG. 10 is viewed from the main body portion side of the housing. Additionally, in FIG. 11, the shape of the opening portion of the groove portion 52 of the main body portion 50 is indicated by a two-dotted chain line which is an imaginary line.

The brake fluid pressure control device 1 preferably includes at least one of a first positioning portion 91 and a second positioning portion 92.

The first positioning portion 91 is for positioning the main body portion 50 and the lid 60 of the housing 40 in the direction perpendicular to the first direction Y. When a space is formed both between the outer peripheral wall 54 and the insertion wall 61 and between the inner peripheral wall 55 and the insertion wall 61 when inserting the insertion wall 61 into the groove portion 52 charged with the sealing material, the amount of the sealing material flowing toward the outer peripheral wall 54 and the amount of the sealing material flowing toward the inner peripheral wall 55 vary when the insertion position of the insertion wall 61 to the groove portion 52 varies. Here, since the insertion position of the insertion wall 61 to the groove portion 52 is stable due to the first positioning portion 91, the amount of the sealing material flowing toward the outer peripheral wall 54 is also stable. Therefore, since the first positioning portion 91 is provided, it is possible to further suppress the sealing material from leaking to the outside of the brake fluid pressure control device 1.

Here, as shown in FIGS. 10 and 11, the first positioning portion 91 is preferably a protrusion and disposed between the outer peripheral wall 54 and the insertion wall 61. Since the main body portion 50 and the lid 60 are positioned in the direction perpendicular to the first direction Y by using the outer peripheral wall 54 which is long in the first direction Y, the insertion position of the insertion wall 61 to the groove portion 52 is further stable. Accordingly, it is possible to further suppress the sealing material from leaking to the outside of the brake fluid pressure control device 1. Further, when the first positioning portion 91 is a protrusion disposed between the outer peripheral wall 54 and the insertion wall 61, the first positioning portion 91 is preferably fixed to the insertion wall 61 of the lid 60 as shown in FIGS. 10 and 11. When the first positioning portion 91 is fixed to the insertion wall 61 of the lid 60, the first positioning portion 91 which serves as a barrier when charging the sealing material does not exist in the periphery of the groove portion 52 when the sealing material is charged into the groove portion 52 of the main body portion 50. Therefore, since the charged amount of the sealing material at each position in the groove portion 52 is stable when the first positioning portion 91 is fixed to the insertion wall 61 of the lid 60, it is possible to further suppress the sealing material from leaking to the outside of the brake fluid pressure control device 1.

Additionally, the number of the protrusions serving as the first positioning portion 91 is not limited to the number shown in FIGS. 10 and 11 and is arbitrary if the main body portion 50 and the lid 60 can be positioned in the direction perpendicular to the first direction Y. Further, the effect of the first positioning portion 91 is an effect which can be obtained regardless of whether the brake fluid pressure control device 1 includes the second positioning portion 92.

The second positioning portion 92 is for positioning the main body portion 50 and the lid 60 of the housing 40 in the first direction Y. If the insertion depth of the insertion wall 61 to the groove portion 52 varies when the insertion wall 61 is inserted into the groove portion 52 charged with the sealing material, the amount of the sealing material flowing toward the outer peripheral wall 54 also varies. Here, since the insertion depth of the insertion wall 61 to the groove portion 52 is stable due to the second positioning portion 92, the amount of the sealing material flowing toward the outer peripheral wall 54 is also stable. Therefore, since the second positioning portion 92 is provided, it is possible to further suppress the sealing material from leaking to the outside of the brake fluid pressure control device 1.

Here, as shown in FIGS. 10 and 11, the second positioning portion 92 is preferably a protrusion and disposed between the end portion of the outer peripheral wall 54 and the lid 60. Since the second positioning portion 92 is disposed at the corresponding position, the second positioning portion 92 serves as a wall portion which regulates the flow of the sealing material which starts to leak from the inside of the groove portion 52 to the outside of the outer peripheral wall 54. Therefore, since the second positioning portion 92 is disposed at the corresponding position, it is possible to further suppress the sealing material from leaking to the outside of the brake fluid pressure control device 1. Further, when the second positioning portion 92 is a protrusion which is disposed between the end portion of the outer peripheral wall 54 and the lid as shown in FIGS. 10 and 11, the second positioning portion 92 is preferably fixed to the lid 60 and contacts the end portion of the outer peripheral wall 54. When the second positioning portion 92 is fixed to the lid 60, the second positioning portion 92 serving as a barrier when charging the sealing material does not exist in the periphery of the groove portion 52 when the sealing material is charged into the groove portion 52 of the main body portion 50. Therefore, since the charged amount of the sealing material at each position in the groove portion 52 is stable when the second positioning portion 92 is fixed to the lid 60, it is possible to further suppress the sealing material from leaking to the outside of the brake fluid pressure control device 1.

Additionally, the number of protrusions serving as the second positioning portion 92 is not limited to the number shown in FIGS. 10 and 11 and is arbitrary if the main body portion 50 and the lid 60 can be positioned in the first direction Y. Further, the effect of the second positioning portion 92 is an effect which can be obtained regardless of whether the brake fluid pressure control device 1 includes the first positioning portion 91.

Although the brake fluid pressure control device 1 according to this embodiment has been described above, the brake fluid pressure control device according to the invention is not limited to the description of this embodiment and may be implemented by appropriately combining only a part of the configurations described in this embodiment.

REFERENCE SIGNS LIST

1: Brake fluid pressure control device
10: Base body
11: Master cylinder port
12: Wheel cylinder port
13: Flow path
14: First flow path
15: Second flow path
16: Third flow path
17: Fourth flow path
18: Surface
20: Hydraulic pressure adjusting valve
21: Inlet valve
22: Outlet valve
23: Accumulator
24: Recess portion
25: Recess portion
30: Control unit
31: Circuit board
40: Housing
50: Main body portion
51: Opening portion
52: Groove portion
53: Bottom portion
54: Outer peripheral wall
55: Inner peripheral wall
60: Lid
61: Insertion wall
62: Insertion region
63: Root portion
64: Center line
65: Outer peripheral line
66: Inner peripheral line
70: Coil
71: Coil
72: Connection terminal
73: Coil
74: Connection terminal
75: Space
81: Outer peripheral region
82: Inner peripheral region
91: First positioning portion
92: Second positioning portion
100: Brake system
101: Liquid pipe
102: Liquid pipe
103: Hydraulic pressure sensor
200: Bicycle
210: Frame
211: Head tube
212: Top tube
213: Down tube
214: Seat tube
215: Stay
216: Front fork
217: Front wheel
218: Saddle
219: Pedal
220: Rear wheel
230: Turning portion
231: Steering column
232: Handle stem
233: Handle bar
240: Braking operation portion
241: Brake lever
242: Master cylinder
243: Reservoir
250: Front wheel brake
251: Wheel cylinder
252: Rotor
260: Rear wheel brake
270: Power unit
301: Brake fluid pressure control device (conventional one)
340: Housing (conventional one)
350: Main body portion (conventional one)
351: Opening portion (conventional one)
352: Groove portion (conventional one)
354: Outer peripheral wall (conventional one)
355: Inner peripheral wall (conventional one)
360: Lid (conventional one)
361: Insertion wall (conventional one)
362: Wall portion (conventional one)

The invention claimed is:
1. A brake fluid pressure control device (1) for a saddle-type vehicle (200), comprising:
a base body (10) to which a flow path (13) for a brake fluid is formed;
a coil (70) which is supported on the base body (10) and drives a hydraulic pressure adjusting valve (20) opening and closing the flow path (13);
a circuit board (31) which controls energization of the coil (70); and
a housing (40) which is connected to the base body (10) and covers the coil (70) and the circuit board (31),
wherein the housing (40) includes a main body portion (50) which is connected to the base body (10) and is provided with an opening portion (51), and a lid (60) which covers the opening portion (51) and is attached to the main body portion (50), wherein the main body portion (50) includes a groove portion (52) which is formed on an outer peripheral side of the opening portion (51) to open toward the lid (60), wherein the lid (60) includes an insertion wall (61) which extends toward the main body portion (50) and is inserted into the groove portion (52), wherein a gap between the groove portion (52) and the insertion wall (61) is sealed by a sealing material, wherein the groove portion (52) includes a bottom portion (53), an outer peripheral wall (54) which constitutes an outer peripheral wall of the groove portion (52) and extends from the bottom portion (53) toward the lid (60), and an inner peripheral wall (55) which constitutes an inner peripheral wall of the groove portion (52) and extends from the bottom portion (53) toward the lid (60), wherein a space (80) for storing the sealing material is formed between the outer peripheral wall (54) and the insertion wall (61) and between the inner peripheral wall (55) and the insertion wall (61), and wherein when a facing direction between the main body portion (50) and the lid (60) is a first direction (Y), a length of the outer peripheral wall (54) in the first direction (Y) is longer than a length of the inner peripheral wall (55) in the first direction (Y) to suppress the sealing material from leaking to an outside of the brake fluid pressure control device (1) by storing the sealing material between the insertion wall (61) and the outer peripheral wall (54), further comprising a plurality of positioning portions (91, 92) fixed to the lid (60) and incrementally spaced to abut the outer peripheral wall (54), the plurality of positioning portions (91, 92) configured to position the outer peripheral wall (54) and the insertion wall (61) to form the space (80) and suppress the sealing material from leaking from the groove portion (52) to an outside of the outer peripheral wall (54).

2. The brake fluid pressure control device (1) according to claim 1, wherein when, in a cross-section obtained by cutting the housing (40) in a virtual plane which is parallel to the first direction (Y) and passes through the insertion wall (61), the outer peripheral wall (54), and the inner peripheral wall (55), a direction perpendicular to the first direction (Y) is a second direction (X), a straight line which passes through a center point in the second direction (X) of a root portion (63) of an insertion region (62) corresponding to a region located on an inside of the groove portion (52) of the insertion wall (61) and is parallel to the first direction (Y) is a center line (64), a straight line which passes through a point on a side closest to the outer peripheral wall (54) in the insertion region (62) and is parallel to the first direction (Y) is an outer peripheral line (65), a straight line which passes through a point on a side closest to the inner peripheral wall (55) in the insertion region (62) and is parallel to the first direction (Y) is an inner peripheral line (66), a region which is surrounded by the insertion wall (61), the center line (64), the outer peripheral line (65), and the bottom portion (53) is an outer peripheral region (81), and a region surrounded by the insertion wall (61), the center line (64), the inner peripheral line (66), and the bottom portion (53) is an inner peripheral region (82), an area of the inner peripheral region (82) is larger than an area of the outer peripheral region (81).

3. The brake fluid pressure control device (1) according to claim 2, wherein the insertion region (62) has an asymmetrical shape with the center line (64) as an axis of symmetry.

4. The brake fluid pressure control device (1) according to claim 1, wherein a first positioning portion (91) of the plurality of positioning portions (91, 92) positions the main body portion (50) and the lid (60) in a direction perpendicular to the first direction (Y).

5. The brake fluid pressure control device (1) according to claim 4, wherein the first positioning portion (91) is a protrusion and is disposed between the outer peripheral wall (54) and the insertion wall (61).

6. The brake fluid pressure control device (1) according to claim 5, wherein the first positioning portion (91) is fixed to the insertion wall (61).

7. The brake fluid pressure control device (1) according to claim 1, wherein a second positioning portion (92) of the plurality of positioning portions (91, 92) positions the main body portion (50) and the lid (60) in the first direction (Y).

8. The brake fluid pressure control device (1) according to claim 7, wherein the second positioning portion (92) is a protrusion and is disposed between an end portion of the outer peripheral wall (54) and the lid (60).

9. The brake fluid pressure control device (1) according to claim 8, wherein the second positioning portion (92) contacts the end portion of the outer peripheral wall (54).

10. A saddle-type vehicle (200) comprising:

the brake fluid pressure control device (1) according to claim 1.

11. The brake fluid pressure control device (1) according to claim 4, wherein a second positioning portion (92) of the plurality of positioning portions (91, 92) positions the main body portion (50) and the lid (60) in the first direction (Y).

12. The brake fluid pressure control device (1) according to claim 11, wherein the second positioning portion (92) is a protrusion and is disposed between an end portion of the outer peripheral wall (54) and the lid (60).

13. The brake fluid pressure control device (1) according to claim 12, wherein the second positioning portion (92) contacts the end portion of the outer peripheral wall (54).

* * * * *